(12) United States Patent
Wen et al.

(10) Patent No.: US 11,265,316 B2
(45) Date of Patent: Mar. 1, 2022

(54) APPARATUS TO AUTOMATICALLY ESTABLISH OR MODIFY MUTUAL AUTHENTICATIONS AMONGST THE COMPONENTS IN A SOFTWARE DEFINED NETWORKING (SDN) SOLUTION

(71) Applicant: VMware, Inc., Palo Alto, CA (US)

(72) Inventors: Ming Wen, Sunnyvale, CA (US); Edilmo Palencia, Santa Clara, CA (US); Russell Lu, Palo Alto, CA (US); Laxmikant Vithal Gunda, San Jose, CA (US); Margaret Petrus, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 49 days.

(21) Appl. No.: 16/998,371

(22) Filed: Aug. 20, 2020

(65) Prior Publication Data
US 2021/0075789 A1    Mar. 11, 2021

Related U.S. Application Data

(60) Provisional application No. 62/898,659, filed on Sep. 11, 2019.

(51) Int. Cl.
*H04L 29/06* (2006.01)

(52) U.S. Cl.
CPC ...... *H04L 63/0869* (2013.01); *H04L 63/0823* (2013.01); *H04L 63/0853* (2013.01); *H04L 63/1408* (2013.01)

(58) Field of Classification Search
CPC ............. H04L 63/0869; H04L 63/0823; H04L 63/0853; H04L 63/1408
See application file for complete search history.

(56) References Cited

U.S. PATENT DOCUMENTS

| | | | | |
|---|---|---|---|---|
| 2012/0266231 | A1* | 10/2012 | Spiers | H04L 67/10 726/12 |
| 2013/0117567 | A1* | 5/2013 | Chang | G06F 21/00 713/170 |
| 2020/0233689 | A1 | 7/2020 | Neginhal et al. | |

\* cited by examiner

*Primary Examiner* — Huan V Doan
(74) *Attorney, Agent, or Firm* — Patterson & Sheridan, LLP

(57) ABSTRACT

The disclosure provides an approach for establishing authentication between components in a network. Embodiments deploying a node of a monitoring appliance in response to a request and providing a token for accessing a network manager to the node of the monitoring appliance. Embodiments include generating, by the node of the monitoring appliance, a certificate of the node of the monitoring appliance and providing the certificate of the node of the monitoring appliance to the network manager with the token for accessing the network manager. Embodiments include adding, by the network manager, based on the token for accessing the network manager, the certificate of the node of the monitoring appliance to a first trust store and providing, by the network manager, a network manager certificate to the node of the monitoring appliance. Embodiments include adding, by the node of the monitoring appliance, the network manager certificate to a second trust store.

20 Claims, 10 Drawing Sheets

APPARATUS TO AUTOMATICALLY ESTABLISH OR MODIFY MUTUAL AUTHENTICATIONS AMONGST THE COMPONENTS IN A SOFTWARE DEFINED NETWORKING (SDN) SOLUTION

RELATED APPLICATIONS

This application claims the benefit of U.S. Provisional Application No. 62/898,659, entitled "APPARATUS TO AUTOMATICALLY ESTABLISH OR MODIFY MUTUAL AUTHENTICATIONS AMONGST THE COMPONENTS IN AN SDN SOLUTION," by the same inventors, filed 11 Sep. 2019, the contents of which are incorporated herein in their entirety.

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. It should be noted that the examples described herein are embodiments, and the techniques are not limited only to the specific examples. For examples, different steps discussed may be performed in a different order where suitable, steps removed, or steps added.

In certain aspects, SDN involves the use of a virtualization management module as a virtualized infrastructure manager (VIM) that may communicate with the plurality of hosts. In one embodiment, the VIM is a computer program that resides and executes in a physical central server, or alternatively, the VIM may run as a VM in one of the hosts.

The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

By monitoring logical network flows (e.g., flow of data packets between endpoints) and correlating these flows with the logical network configuration, end users (e.g., administrators) can visualize communication across endpoints, receive recommendation of micro-segmented logical network configuration, troubleshoot network connectivity issues, and detect threats. In certain aspects, a monitoring module, correlates different data sources from the logical overlay network, such as logical network flow data from managed hosts, logical network configuration (e.g., corresponding to the MP), as well as context data from the guest VMs. The foundation of the monitoring module is to build a data pipeline to collect data from sources in the data center, correlate them, and store the correlated results for downstream consumption.

The monitoring module data pipeline relies on messaging brokers to exchange messages among messaging clients. Messaging clients include configuration interceptors or configuration agents in MP applications, network flow interceptors or flow and context agents in managed hosts, and multiple monitoring module applications/services that correlate logical network configuration with network flow data as well as perform other computational tasks.

To ensure that analytical results can be trusted and are not leaked to an adversary, in some embodiments, the monitoring module makes sure messaging brokers and messaging clients can mutually authenticate each other's identities. For example, the authentication can be performed by one messaging broker/messaging client checking the public key of another messaging broker/messaging client against its own trust store.

In certain cases, establishment of mutual authentication among components like messaging brokers and clients can be performed according to one of two categories: (1) relying on a trusted third-party like a certificate authority (CA), or (2) using self-signed certificates and securely exchanging those certificates. Since CA signed certificates may be costly and may be inflexible due to long approval processes, using a self-signed certificate is a popular choice.

When using a self-signed certificate, one challenge is determining how to exchange certificates of components securely and correctly. While initial mutual authentication can be established via securely exchanging certificates among messaging clients and brokers, such as during the monitoring module deployment, maintaining the established authentication without additional user operations is challenging for a variety of reasons: For example, MP and the monitoring module applications are usually deployed as distributed systems. Accordingly, a group of computing nodes (e.g., physical servers and/or VCIs) act collaboratively as a cluster. As the membership of the cluster can change, such as due to fault failover or auto scaling, new messaging brokers and clients can be created while old brokers and clients can be deleted. Another difficulty arises from the fact that hosts participating in a logical overlay network are dynamic. New hosts can join the logical overlay network and old hosts can leave the network. As a result, new messaging clients need to be authenticated and old clients need to be revoked. Furthermore, the certificate/private key of a MP node, the monitoring module node, or a host can be updated due to expiration or revocation after being compromised. Authentication of messaging brokers and clients need to use the latest certificate. Finally, it is important to ensure that message loss does not happen, regardless of whether (a) authentication needs to be performed for a new broker or client, or (b) authentication needs to be performed using a new certificate.

As such, there is a need in the art for improved techniques of establishing mutual authentication among components in an SDN environment.

SUMMARY

Embodiments provide a method of establishing authentication among components in a network. Embodiments include: receiving, by a virtualization manager, a request to deploy a node of a monitoring appliance, wherein the request comprises a token for accessing a network manager; deploying, by the virtualization manager, the node of the monitoring appliance in response to the request; providing, by the virtualization manager, the token for accessing the network manager to the node of the monitoring appliance; generating, by the node of the monitoring appliance, a certificate of the node of the monitoring appliance; providing, by the node of the monitoring appliance, the certificate of the node of the monitoring appliance to the network manager with the token for accessing the network manager; adding, by the network manager, based on the token for accessing the network manager, the certificate of the node of the monitoring appliance to a first trust store; providing, by the network manager, a network manager certificate to the node of the monitoring appliance; and adding, by the node of the monitoring appliance, the network manager certificate to a second trust store.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for establishing authentication among components in a network according to embodiments of the present disclosure.

Certain embodiments of techniques disclosed herein allow exchange of certificates among messaging brokers and clients without relying on external components such as a distributed database or a distributed file system. In certain embodiments, messaging brokers and clients themselves are made capable of automated certificate exchange by maintaining trusted messaging channels between one another. As long as there are trusted messaging channels in the system, new certificates can be added to establish new trusted messaging channels, and old certificates can be deleted to remove obsolete messaging channels. As compared with existing mechanisms, embodiments of techniques described herein do not require a distributed database to be installed, or a distributed file system to be configured, thus reducing resource consumption and system complexity.

In an example, initial trusted messaging channels may be established when a user deploys nodes of a monitoring appliance (e.g., running a monitoring module) that is implemented in a distributed fashion. Mutual authentication of messaging brokers and clients may be maintained automatically using embodiments of workflows discussed herein with respect to FIGS. 3-10, such that an authorized user can add or remove management nodes, monitoring appliance nodes, and hosts, as well as update certificates and private keys while maintaining mutual authentication without message loss.

Figure 1:
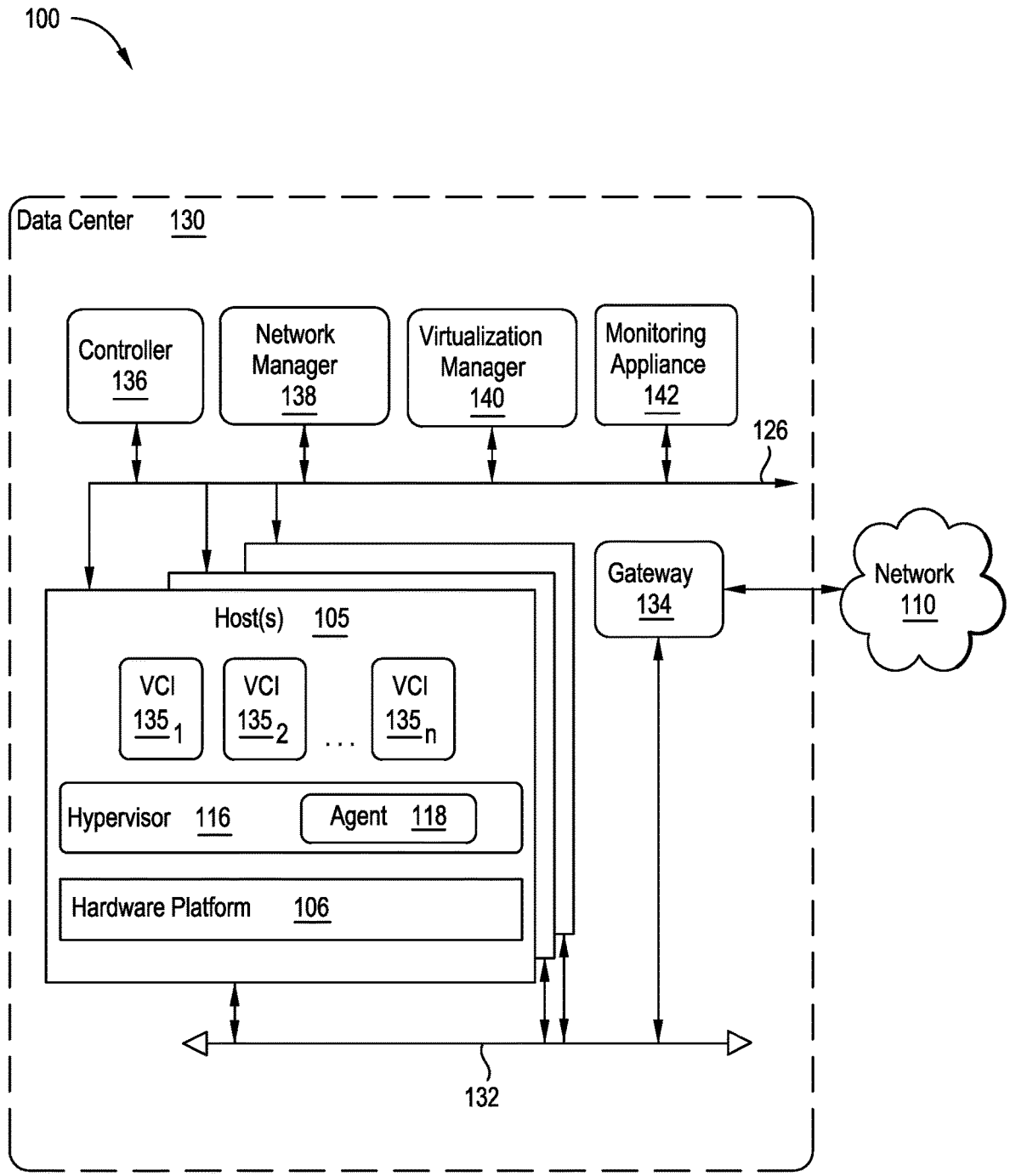
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Implementing a control plane as a cluster, as well as various sharding techniques for distributing data by a clustered control plane, is described in more detail in U.S. Pat. No. 10,447,535, the contents of which are incorporated herein by reference in their entirety. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Network manager 138 and virtualization manager 140 generally represent components of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, network manager 138 is a computer program that executes in a central server in networking environment 100, or alternatively, network manager 138 may run in a VM, e.g. in one of hosts 105. Although shown as a single unit, it should be understood that network manager 138 may be implemented as a distributed or clustered system. That is, network manager 138 may include multiple servers or VCIs that implement management functions. Network manager 138 is configured to receive inputs from an administrator or other entity, e.g., via a web interface or API, and carry out administrative tasks for data center 130, including centralized network management and providing an aggregated system view for a user.

In an embodiment, virtualization manager 140 is a computer program that executes in a central server in data center 130 (e.g., the same or a different server than the server on which network manager 138 executes), or alternatively, virtualization manager 140 runs in one of VCIs 135. Virtualization manager 140 is configured to carry out administrative tasks for data center 130, including managing hosts 105, managing VCIs 135 running within each host 105, provisioning VCIs 135, transferring VCIs 135 from one host to another host, transferring VCIs 135 between data centers, transferring application instances between VCIs 135 or between hosts 105, and load balancing among hosts 105 within data center 130. Virtualization manager 140 takes commands from components located on control network 126 as to creation, migration, and deletion decisions of VCIs 135 and application instances on data center 130. However, virtualization manager 140 also makes independent decisions on management of local VCIs 135 and application instances, such as placement of VCIs 135 and application instances between hosts 105. Virtualization manager 140 includes a distributed resource scheduler (DRS). In some embodiments, virtualization manager 140 also includes a migration component that performs migration of VCIs between hosts 105, such as by live migration.

Monitoring appliance 142 generally represents a component of data center 130 that monitors attributes of workloads, such as VCIs, on hosts 105 and performs labeling of workloads according to embodiments of the present disclosure. In one embodiment, monitoring appliance 142 is a computer program that executes in a central server in networking environment 100, or alternatively, monitoring appliance 142 may run in one or more VCIs, e.g. in one or more of hosts 105. In one embodiment, monitoring appliance 142 is implemented in a distributed fashion via a plurality of nodes that are distributed across a plurality of VCIs on a plurality of hosts 105.

In some embodiments, monitoring appliance 142 communicates with an agent on each of hosts 105, such as agent 118 in hypervisor 116, in order to retrieve attributes of VCIs, such as VCIs 135. In some embodiments, attributes are retrieved by hypervisor 116 from endpoint monitoring components (not shown) running on every VCI and/or from network flow data, such as through a virtual switch, monitored by hypervisor 116 on each host 105. Attributes may include, for example, network ports (e.g., coupled to a virtual switch) on which a VCI listens for traffic, network ports on which a VCI connects to remote processes, processes running on a VCI, remote processes to which a VCI connects, numbers of connections to a process or port from a VCI, numbers of processes running on a VCI, command line parameters of a VCI, and/or the like.

In certain embodiments, as described in more detail below with respect to FIG. 2, individual nodes of monitoring appliance 142 communicate with agents on hosts 105, network manager 138, and virtualization manager 140 via messaging brokers within the nodes. Monitoring appliance 142 may include one or more services that perform various functions based on the data received by the messaging brokers of monitoring appliance 142 from hosts 105. For example, services may provide analysis and security functions based on flow and context information received from hosts 105, such as threat detection and the like.

According to embodiments of the present disclosure, trust is established among nodes of monitoring appliance 142, network manager 138, and hosts 105 via secure messaging channels between messaging brokers and agents. For example, initial mutual authentication among nodes of monitoring appliance 142, network manager 138, and hosts 105 can be established automatically when a node of monitoring appliance 142 is deployed. Mutual authentication can be established automatically when users add or delete a node of network manager 138, a host 105, or a node of monitoring appliance 142, or when users change a certificate and/or private key in any of those components. By employing techniques described herein, delivery of messages is not disturbed when users add or delete a node of network manager 138, a host 105, or a node of monitoring appliance 142, or change a certificate and/or private key in any of those components.

Figure 2:
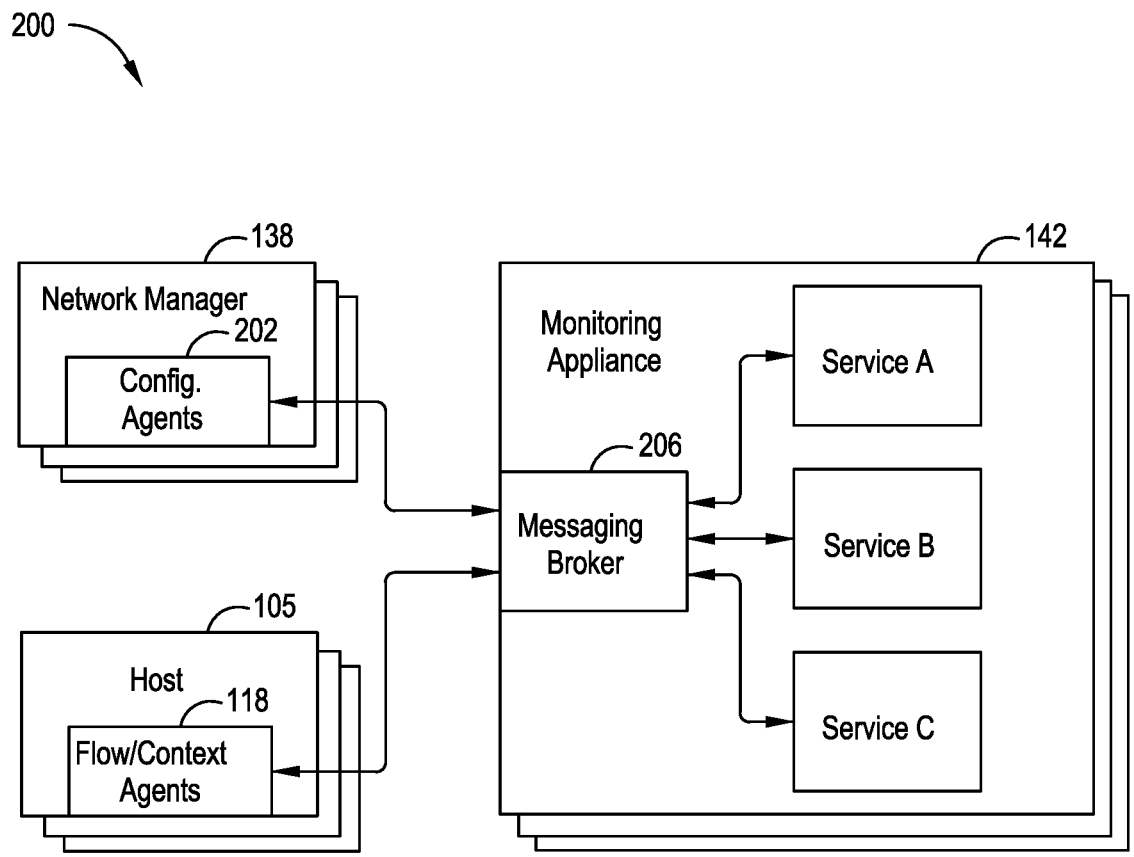
FIG. 2 is an illustration of components for establishing mutual authentication in a network according to embodiments of the present disclosure.

FIG. 2 is an illustration 200 of components for establishing mutual authentication in a network according to embodiments of the present disclosure. Illustration 200 includes network manager 138, hosts 105, and monitoring appliance 142 of FIG. 1.

Network manager 138, which is implemented as a plurality of nodes, includes a configuration agent 202 on each node. Each configuration agent 202 generally represents an agent that allows a node of network manager 138 to communicate with monitoring appliance 142. Each host 105 includes a flow/context agent 118, as described above with respect to FIG. 1, which allows the host 105 to communicate with monitoring appliance 142.

Monitoring appliance 142 is implemented as a plurality of nodes, and each node includes a messaging broker 206. Messaging broker 206 facilitates communication between monitoring appliance 142 and other components, such as network manager 138 and hosts 105. Monitoring appliance 142 also includes various services (represented by services A, B, and C). While three services A, B, and C are shown on a single node of monitoring appliance 142, it is noted that each node may include one or more services, and the services may vary between nodes.

Because monitoring appliance 142 comprises a group of services that rely on functionality of network manager 138, each newly deployed node of monitoring appliance 142 needs to register with network manager 138. In some cases, a user provides administrator credentials in the node of monitoring appliance 142 to complete this registration step. In certain embodiments, a one-time token (e.g., that is effective for a short period of time, such as 30 minutes) is passed from network manager 138 to the node of monitoring component 142 during deployment. The token may be used as a replacement for the administrator credentials to complete registration.

Any certificate change known to network manager 138 can be automatically replicated to all network manager 138 nodes by a database, since network manager 138 uses a clustered database to share information.

As described in more detail below with respect to FIGS. 3-10, secure message channels between messaging brokers 206 and configuration agents 202 and flow/context agents 118 may be used to establish and maintain trust among nodes of network manager 138, nodes of monitoring appliance 142, and hosts 105.

Figure 3:
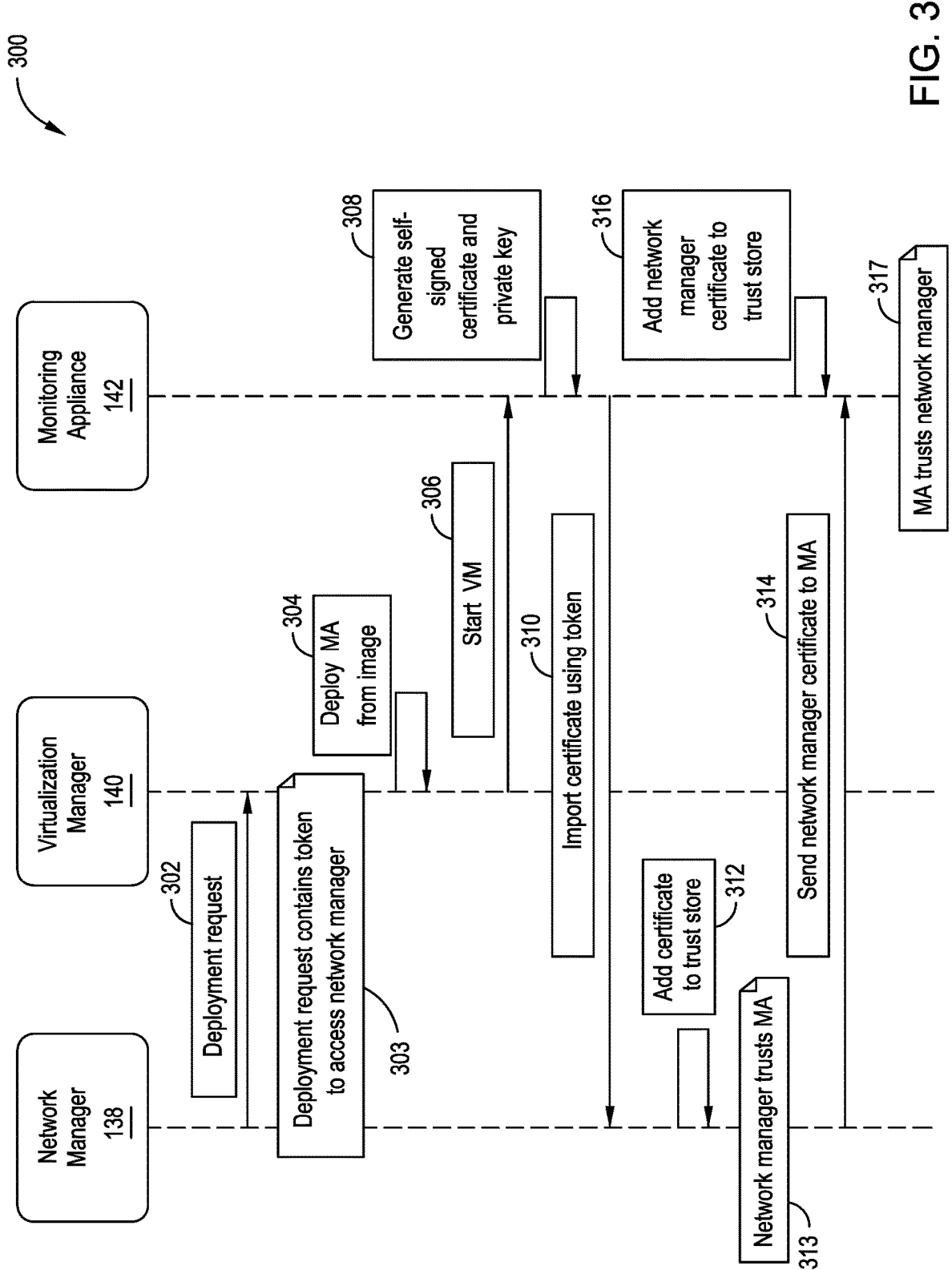
FIG. 3 depicts an example of an exchange of messages related to establishing authentication among components in a network according to embodiments of the present disclosure.

FIG. 3 depicts an example of an exchange 300 of messages related to establishing authentication among components in a network according to embodiments of the present disclosure. Exchange 300 includes network manager 138, virtualization manager 140, and monitoring appliance 142 of FIG. 1. Exchange 300 may relate to deployment of a new node of monitoring appliance 142.

Mutual trust between network manager 138 and the node of monitoring appliance 142 is established via exchange 300. At 302, a deployment request is sent from network manager 138 to virtualization manager 140 to deploy a node of monitoring appliance 142. As indicated at 303, the deployment request contains a token for accessing network manager 138. At 304, virtualization manager 140 deploys the node of monitoring appliance 142 from an image based on the deployment request and, at 306, virtualization manager 140 starts a VM that is the node of monitoring appliance 142. Virtualization manager 140 provides the token to access network manager 138 to the VM upon startup. At 308, the node of monitoring appliance 142 generates a self-signed certificate and a private key.

At 310, the self-signed certificate generated at 308 is imported from the node of monitoring appliance 142 to network manager 138 using the token for accessing network manager 138. At 312, network manager 138 adds the self-signed certificate to its trust store. Accordingly, at 313, network manager 138 trusts the node of monitoring appliance 142.

At 314, network manager 138 sends a network manager certificate to the node of monitoring appliance 142. For example, the node of monitoring appliance 142 may request the network manager certificate from network manager 138 using the token for accessing network manager 138, and network manager 138 may send the network manager certificate to the node of monitoring appliance 142 in response to the request. At 316, the node of monitoring appliance 142 adds the network manager certificate to its trust store. At 317, the node of monitoring appliance 142 trusts network manager 138. As such, mutual trust has been established between network manager 138 and the newly deployed node of monitoring appliance 142. The mutual trust that has been established allows messages to be authenticated. For example, the node of monitoring appliance 142 and network manager 138 may each include their respective signatures in outgoing messages to one another. Furthermore, the node of monitoring appliance 142 and network manager 138 may each may check a signature included in each incoming message against their respective trust stores to confirm that each message comes from a trusted source.

A node of monitoring appliance 142 contains a set of services (distributed in a set of processes) that consumes messages sent to the messaging broker of the node. The services share the same self-signed certificate/private key (which may be referred to herein as a client certificate/private key) that is used to communicate with the messaging broker. When the node of monitoring appliance 142 is started for the first time, the client certificate is added to the messaging broker's trust store in the node of monitoring appliance 142, and the messaging broker's certificate is added to the node's trust store. As a result, mutual authentication is established for services inside of monitoring appliance 142 in the local node.

Figure 4:
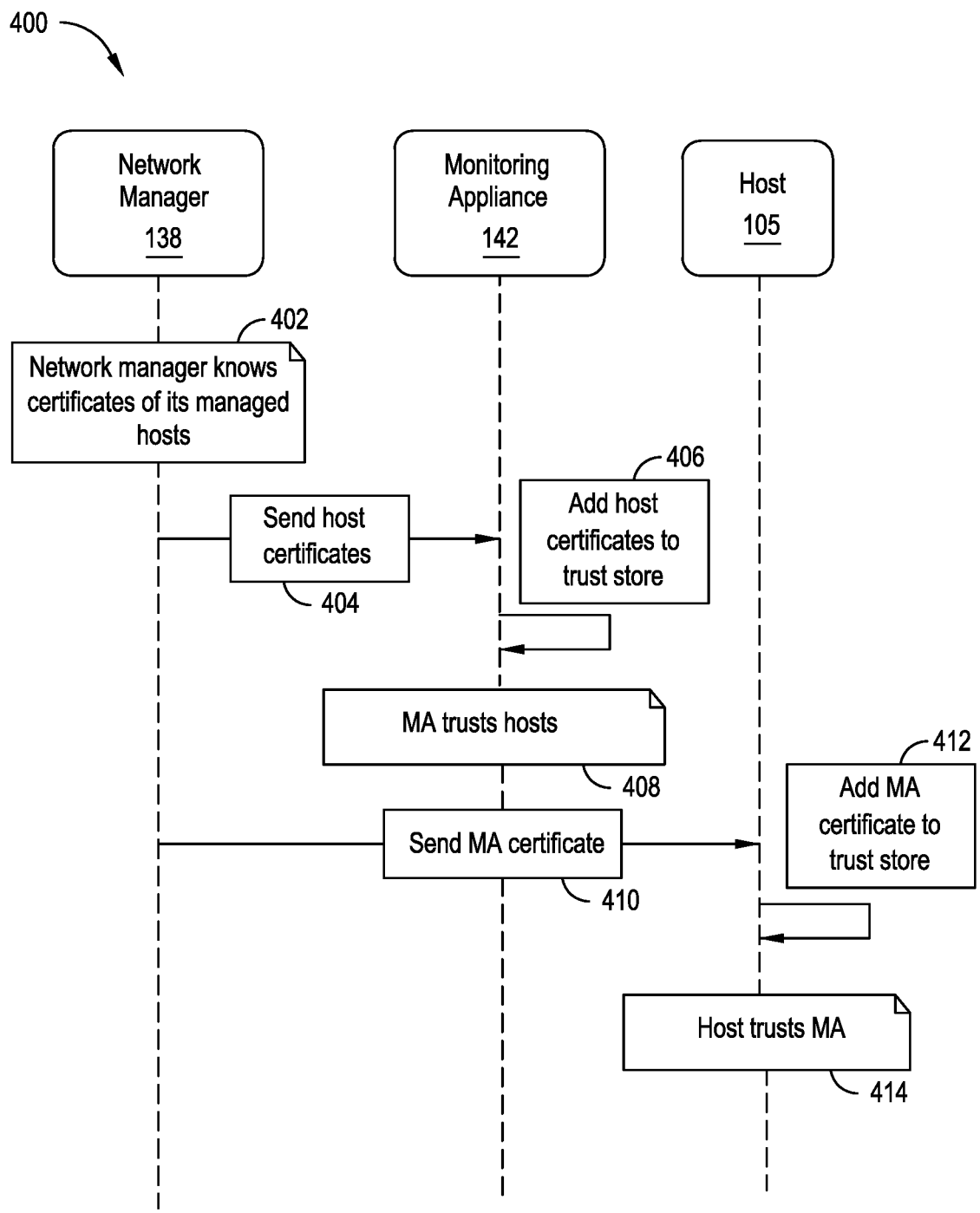
FIG. 4 depicts another example of an exchange of messages related to establishing authentication among components in a network according to embodiments of the present disclosure.

FIG. 4 depicts another example of an exchange 400 of messages related to establishing authentication among components in a network according to embodiments of the present disclosure. Exchange 400 includes network manager 138, monitoring appliance 142, and a host 105 of FIG. 1. Exchange 400 may relate to establishing mutual authentication between a node of monitoring appliance 142 (e.g., the newly deployed node from exchange 300 of FIG. 3) and a host 105.

After mutual authentication is established between network manager 138 and monitoring appliance 142, the certificates of hosts, which are already known by network manager 138, can be sent to the messaging broker hosted in monitoring appliance 142 using the secure messaging channel. When monitoring appliance 142 receives the message, it adds the certificates to its messaging broker's trust store. Similarly, network manager 138 also sends the certificate of monitoring appliance 142 to its managed hosts, and the certificate is added to each host messaging client's trust store. As a result, mutual authentication can be established between hosts and monitoring appliance 142.

At 402, network manager 138 knows the certificates of its managed hosts. At 404, network manager 138 sends the certificates of its managed hosts to the node of monitoring appliance 142. At 406, the node of monitoring appliance 142 adds the certificates sent at 404 to its trust store. Thus, at 408, the node of monitoring appliance 142 trusts the hosts managed by network manager 138. At 410, network manager 138 sends the certificate of the node of monitoring appliance 142 to a host 105 (e.g., representative of each host managed by network manager 138). At 412, host 105 adds the certificate of the node of monitoring appliance 142 to its trust store. At 414, host 105 trusts the node of monitoring appliance 142. As a result, mutual authentication is established between the node of monitoring appliance 142 and each host 105 managed by network manager 138.

Figure 5:
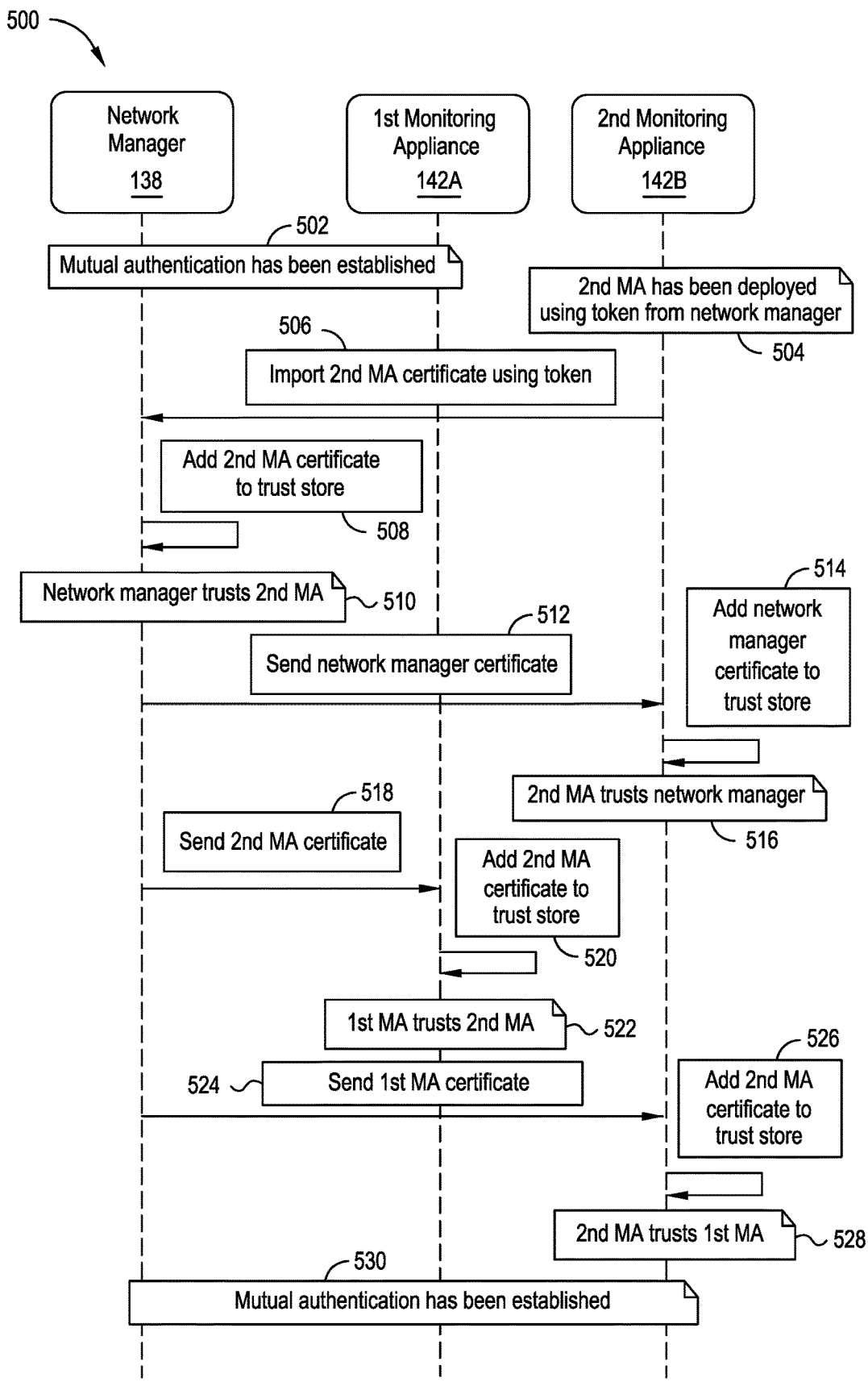
FIG. 5 depicts another example of an exchange of messages related to establishing authentication among components in a network according to embodiments of the present disclosure.

FIG. 5 depicts another example of an exchange 500 of messages related to establishing authentication among components in a network according to embodiments of the present disclosure. Exchange 500 includes network manager 138, and a first and second node of monitoring appliance 142 of FIG. 1. Exchange 500 may relate to establishing mutual authentication between two nodes of monitoring appliance 142 and network manager 138, such as when a new node of monitoring appliance 142 is added to the network.

Multiple nodes of monitoring appliance 142 can be deployed from network manager 138 to form a cluster, and each node can potentially have a messaging broker. The certificate and private key of each messaging broker is generated independently at deployment time, so they are not known by other messaging brokers or clients. Since deployment of monitoring appliance 142 nodes must go through network manager 138, establishing mutual authentication between network manager 138 and new nodes of monitoring appliance 142 is similar to the workflow of establishing initial authentication, except the new node needs to exchange broker certificates with all of the other brokers.

At 502, mutual authentication has already been established between network manager 138 and a first monitoring appliance node 142A. At 504, a second monitoring appliance node 142B has been deployed using a token from network manager 138 (e.g., via virtualization manager 140 in a manner similar to that described above with respect to FIG. 3). At 506, the certificate of the second monitoring appliance 142B is imported to network manager 138 using the token for accessing the network manager. At 508, network manager 138 adds the certificate of the second monitoring appliance 142B to its trust store. Thus, at 510, network manager 138 trusts second monitoring appliance 142B.

At 512, network manager 138 sends the network manager certificate to second monitoring appliance 142B. For example, second monitoring appliance 142B may request the network manager certificate from network manager 138 using the token for accessing network manager 138, and network manager 138 may send the network manager certificate to second monitoring appliance 142B in response to the request. At 514, second monitoring appliance 142B adds the network manager certificate to its trust store. Thus, at 516, second monitoring appliance 142B trusts network manager 138.

At 518, network manager 138 sends the second monitoring appliance's certificate to first monitoring appliance 142A. At 520, first monitoring appliance 142A adds the second monitoring appliance's certificate to its trust store. Thus, at 522, first monitoring appliance 142A trusts second monitoring appliance 142B.

At 524, network manager 138 sends the first monitoring appliance's certificate to second monitoring appliance 142B. At 526, second monitoring appliance 142B adds the first monitoring appliance's certificate to its trust store. Thus, at 528, second monitoring appliance 142B trusts first monitoring appliance 142A.

At 530, mutual authentication has been established among network manager 138, first monitoring appliance 142A, and second monitoring appliance 142B.

All nodes of a cluster that makes up network manager 138 share the same certificate/private key. The certificate and private key are replicated via a database to a new network manager 138 node when a new network manager 138 node joins the cluster.

When a network manager 138 node is removed from cluster, its cluster certificate is not removed. However, since the messaging broker of monitoring appliance 142 relies on some other components, such as a database, to be functional, and because the database of the removed node of network manager 138 may be down after being removed from the cluster, there will be no way for the removed node to communicate with the messaging broker of monitoring appliance 142. As such, the removed node of network manager 138 will be effectively disconnected from the network.

Figure 6:
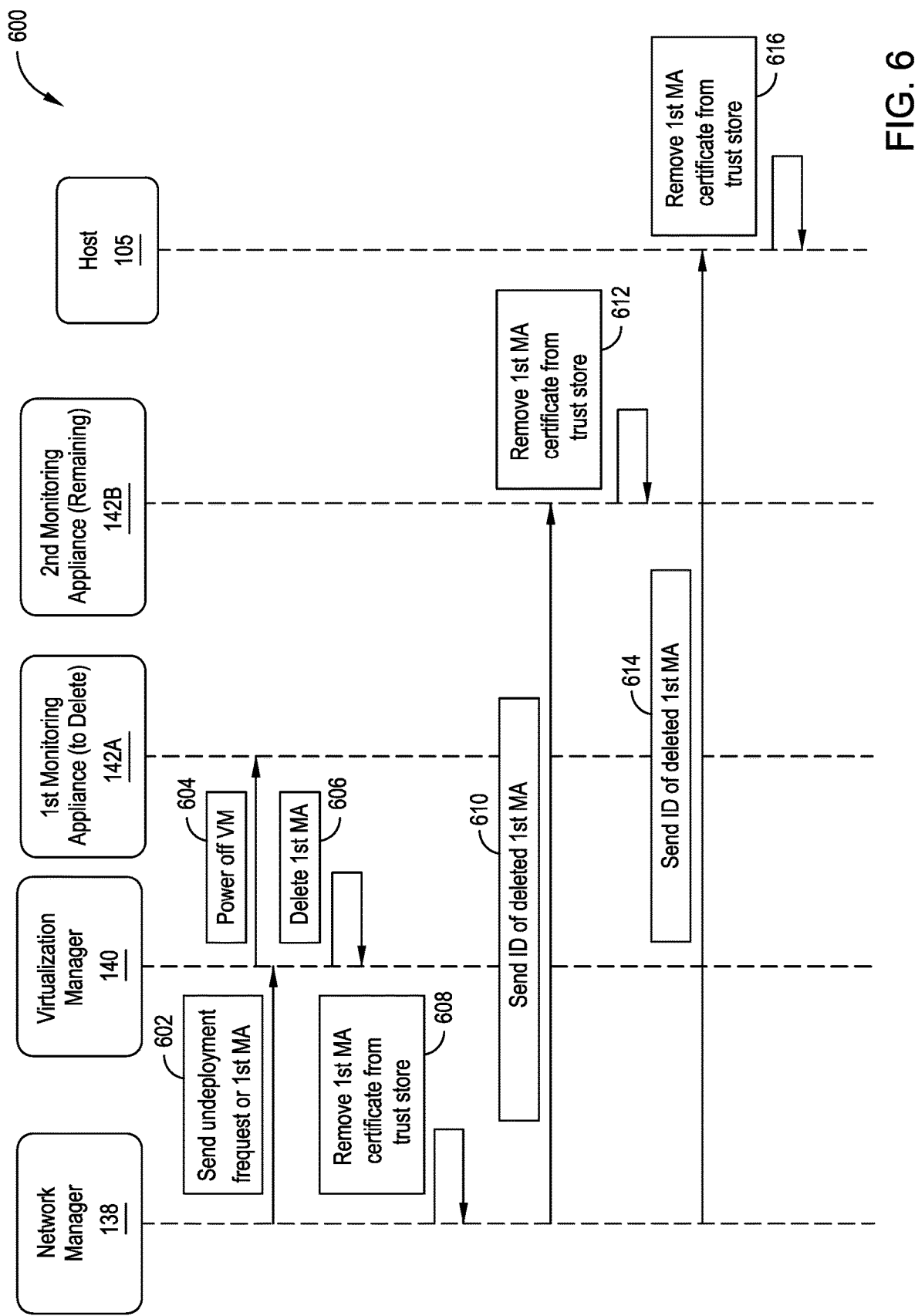
FIG. 6 depicts another example of an exchange of messages related to establishing authentication among components in a network according to embodiments of the present disclosure.

FIG. 6 depicts another example of an exchange 600 of messages related to establishing authentication among components in a network according to embodiments of the present disclosure. Exchange 600 includes network manager 138, virtualization manager 130, a first and second node of monitoring appliance 142, and a host 105 of FIG. 1. Exchange 600 may relate to handling removal of a monitoring appliance node.

The certificates of a node of monitoring appliance 142 can be deleted from both network manager 138 and hosts managed by network manager 138 if the node of monitoring appliance 142 is undeployed via network manager 138. Network manager 138 sends a request to each remaining node of monitoring appliance 142 and its managed hosts to delete the certificate from their respective trust stores.

At 602, network manager 138 sends an undeployment request for first monitoring appliance 142A to virtualization manager 140. For example, an administrator may have provided configuration input to network manager 138 requesting to remove first monitoring appliance 142A from the network. At 604, virtualization manager powers off the VM comprising first monitoring appliance 142A. At 606, virtualization manager 140 deletes first monitoring appliance 142A from the network.

At 608, network manager 138 removes the certificate of first monitoring appliance 142A from its trust store. At 610, network manager 138 sends an identifier of the deleted first monitoring appliance 142A to second monitoring appliance 142B and, at 612, second monitoring appliance 142B removes the certificate of first monitoring appliance 142A from its trust store. At 614, network manager 138 sends an identifier of the deleted first monitoring appliance 142A to host 105 and, at 616, host 105 removes the certificate of first monitoring appliance 142A from its trust store. A similar process may be repeated for any additional nodes of monitoring appliance 142 and/or any additional hosts 105 to ensure that all remaining nodes and hosts remove the certificate of the deleted first monitoring appliance 142A from their respective trust stores.

Figure 7:
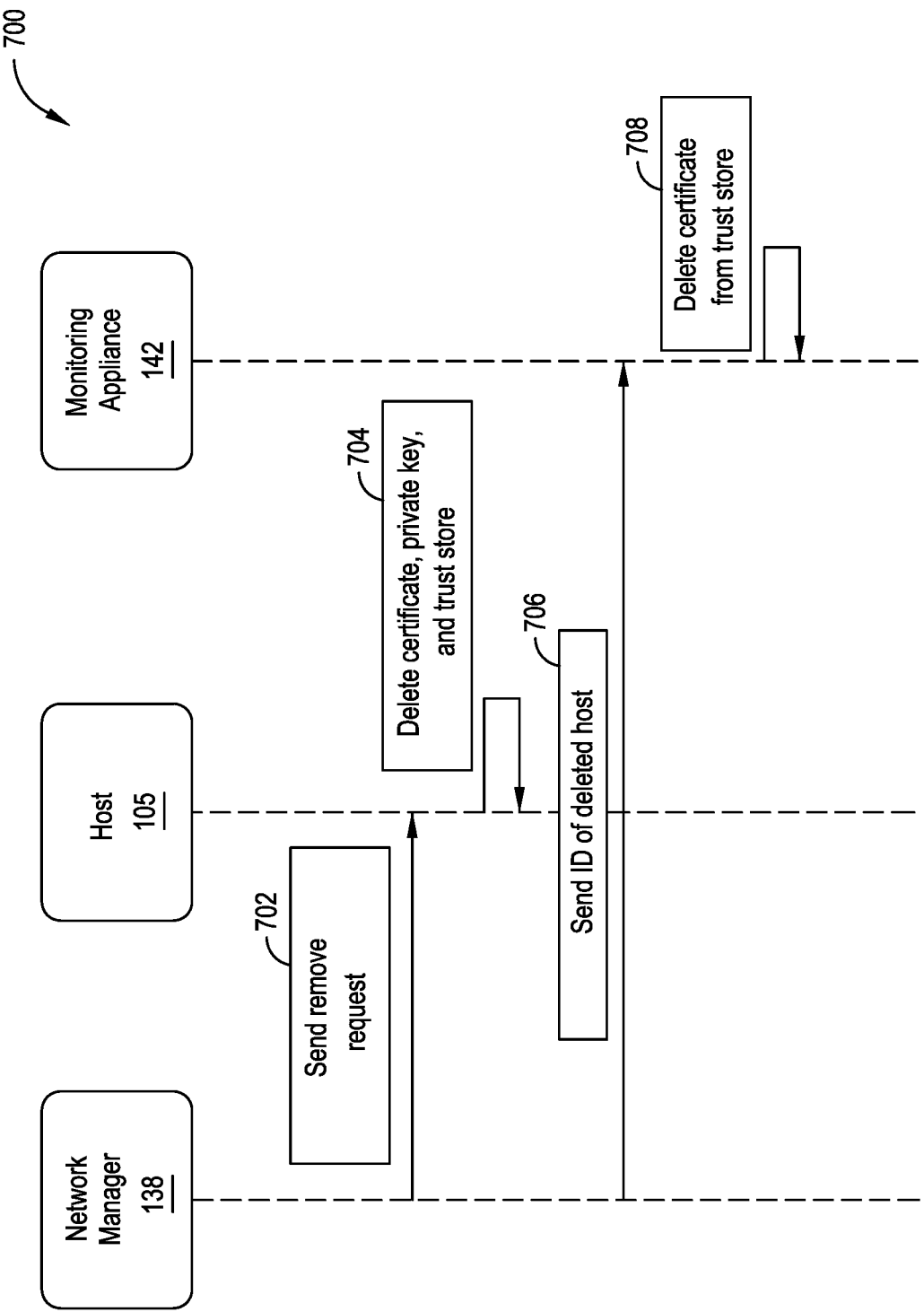
FIG. 7 depicts another example of an exchange of messages related to establishing authentication among components in a network according to embodiments of the present disclosure.

FIG. 7 depicts another example of an exchange 700 of messages related to establishing authentication among components in a network according to embodiments of the present disclosure. Exchange 700 includes network manager 138, a host 105, and monitoring appliance 142 of FIG. 1. Exchange 700 may relate to handling removal of a host.

A host can uninstall components of network manager 138 and stop being managed by network manager 138. Since network manager 138 knows when a host is deleted, network manager 138 sends the information of a deleted host to monitoring appliance 142 so that the certificate of the host can be removed from the trust store of monitoring appliance 142.

At 702, network manager 138 sends a remove request to host 105. For example, an administrator may have provided configuration input to network manager 138 requesting to remove host 105 from the network. At 704, host 105 deletes its certificate, private key and trust store.

At 706, network manager 138 sends an identifier of the deleted host 105 to monitoring appliance 142 (e.g., to each of one or more nodes of monitoring appliance 142). At 708, monitoring appliance 142 deletes the certificate of the deleted host 105 from its trust store.

Figure 8:
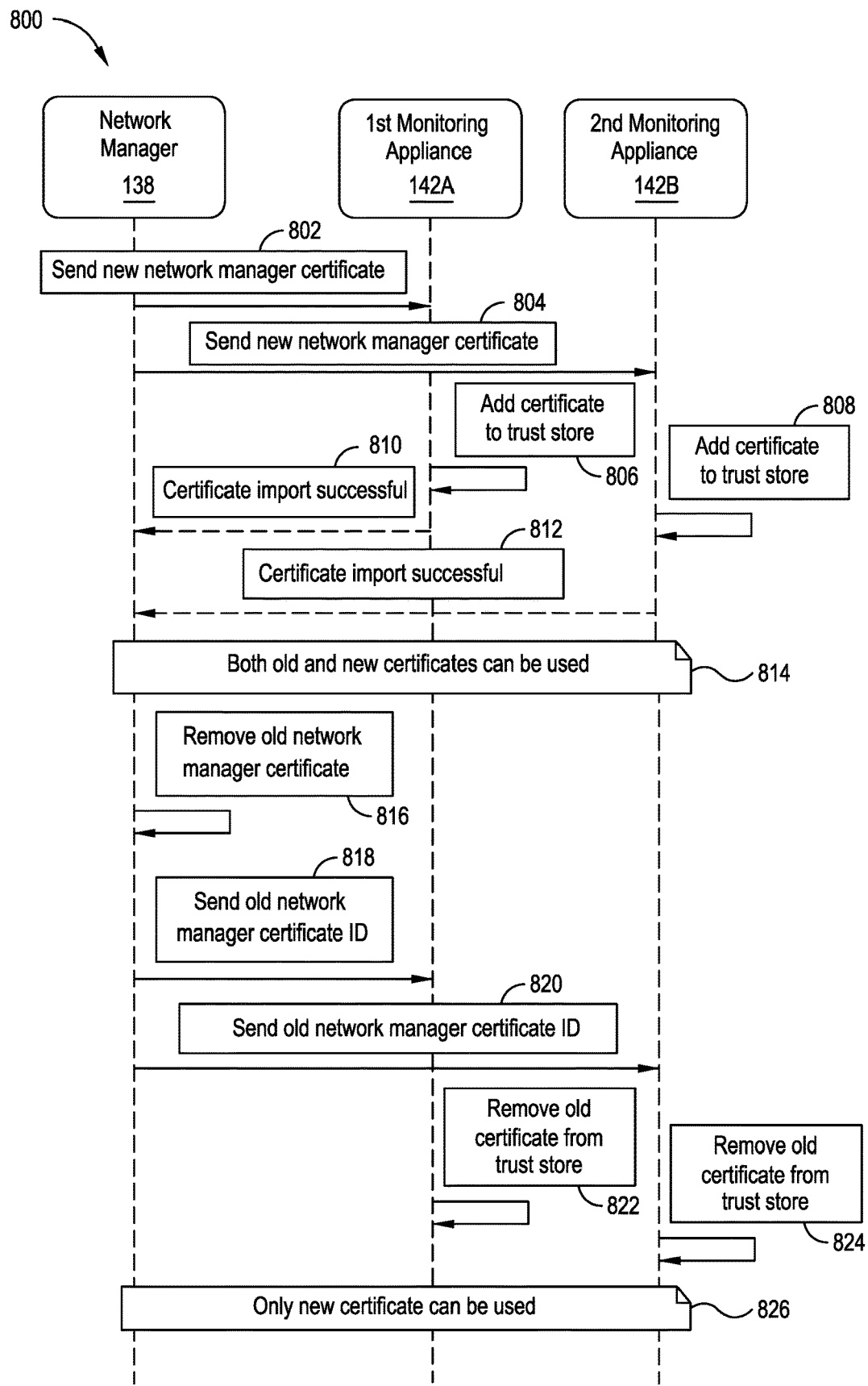
FIG. 8 depicts another example of an exchange of messages related to establishing authentication among components in a network according to embodiments of the present disclosure.

FIG. 8 depicts another example of an exchange 800 of messages related to establishing authentication among components in a network according to embodiments of the present disclosure. Exchange 800 includes network manager 138 and two nodes of monitoring appliance 142 of FIG. 1. Exchange 800 may relate to handling a certificate change for network manager 138. For example, the certificates of components in the network, such as network manager 138, may be updated periodically or in response to various events (e.g., configuration inputs, threat detection, and/or the like).

A certificate and private key of network manager 138, a node of monitoring appliance 142, or a host can be changed by a user. The changed certificate needs to be propagated to all related components to make sure messaging channels are still mutually authenticated. First, the new certificate is added to trust stores so connections using both the old and new certificates can be authenticated. Then, the old certificate is removed so that only the new certificate can be used to establish mutual authentication.

At 802, network manager 138 sends a new network manager certificate to first monitoring appliance 142A and, at 804, network manager 138 sends the new network manager certificate to second monitoring appliance 142B. At 806, first monitoring appliance 142A adds the new network manager certificate to its trust store and, at 808, second monitoring appliance 142B adds the new network manager certificate to its trust store. At 810 and 812, respectively, first monitoring appliance 142A and second monitoring appliance 142B each send a notification to network manager 138 that the new network manager certificate was successfully imported.

At 814, both an old network manager certificate and the new network manager certificate can be used. At 816, network manager 138 removes the old network manager certificate. At 818, network manager 138 sends an identifier of the old network manager certificate to first monitoring appliance 142A and, at 820, network manager 138 sends the identifier of the old network manager certificate to second monitoring appliance 142B. At 822, first monitoring appliance 142A removes the old network manager certificate from its trust store and, at 824, second monitoring appliance 142B removes the old network manager certificate from its trust store.

At 826, only the new network manager certificate can be used.

Figure 9:
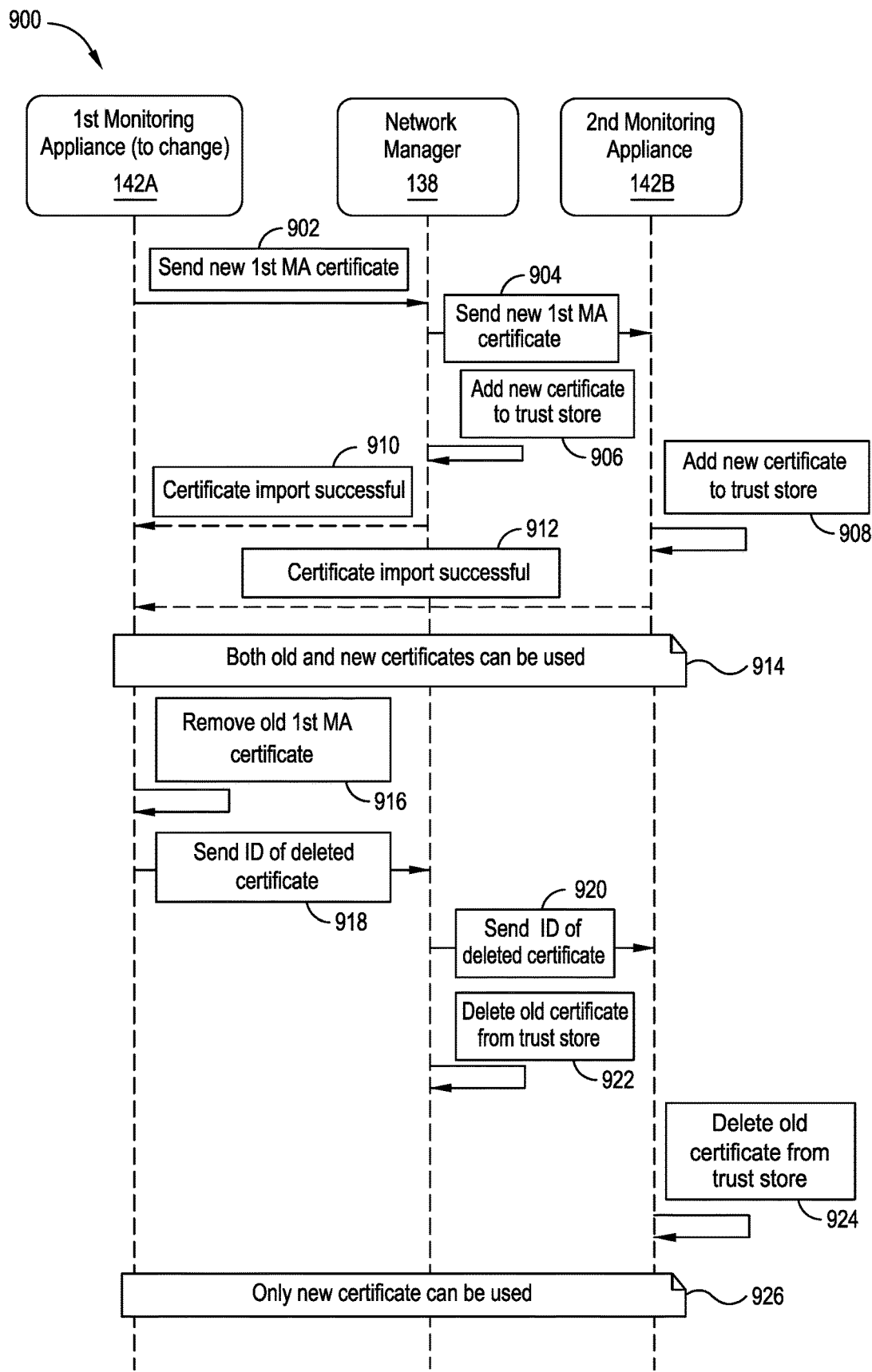
FIG. 9 depicts another example of an exchange of messages related to establishing authentication among components in a network according to embodiments of the present disclosure.

FIG. 9 depicts another example of an exchange 900 of messages related to establishing authentication among components in a network according to embodiments of the present disclosure. Exchange 900 includes network manager 138 and two nodes of monitoring appliance 142 of FIG. 1. Exchange 900 may relate to handling a certificate change for first monitoring appliance 142A.

At 902, first monitoring appliance 142A sends a new certificate for first monitoring appliance 142A to network manager 138 and, at 904, network manager 138 sends the new certificate for first monitoring appliance 142A to second monitoring appliance 142B. At 906, network manager 138 adds the new certificate of first monitoring appliance 142A to its trust store and, at 908, second monitoring appliance 142B adds the new certificate for first monitoring appliance 142A to its trust store. At 910 and 912, respectively, network manager 138 and second monitoring appliance 142B each send a notification to first monitoring appliance 142A that the new certificate of first monitoring appliance 142A was successfully imported.

At 914, both an old certificate and the new certificate of first monitoring appliance 142A can be used. At 916, first monitoring appliance 142A removes the old certificate of first monitoring appliance 142A. At 918, first monitoring appliance 142A sends an identifier of the old certificate of first monitoring appliance 142A to network manager 138 and, at 920, network manager 138 sends the identifier of the old certificate of first monitoring appliance 142A to second monitoring appliance 142B. At 922, network manager 138 removes the old certificate of first monitoring appliance 142A from its trust store and, at 924, second monitoring appliance 142B removes the old certificate first monitoring appliance 142A from its trust store.

At 926, only the new certificate of first monitoring appliance 142A can be used.

Figure 10:
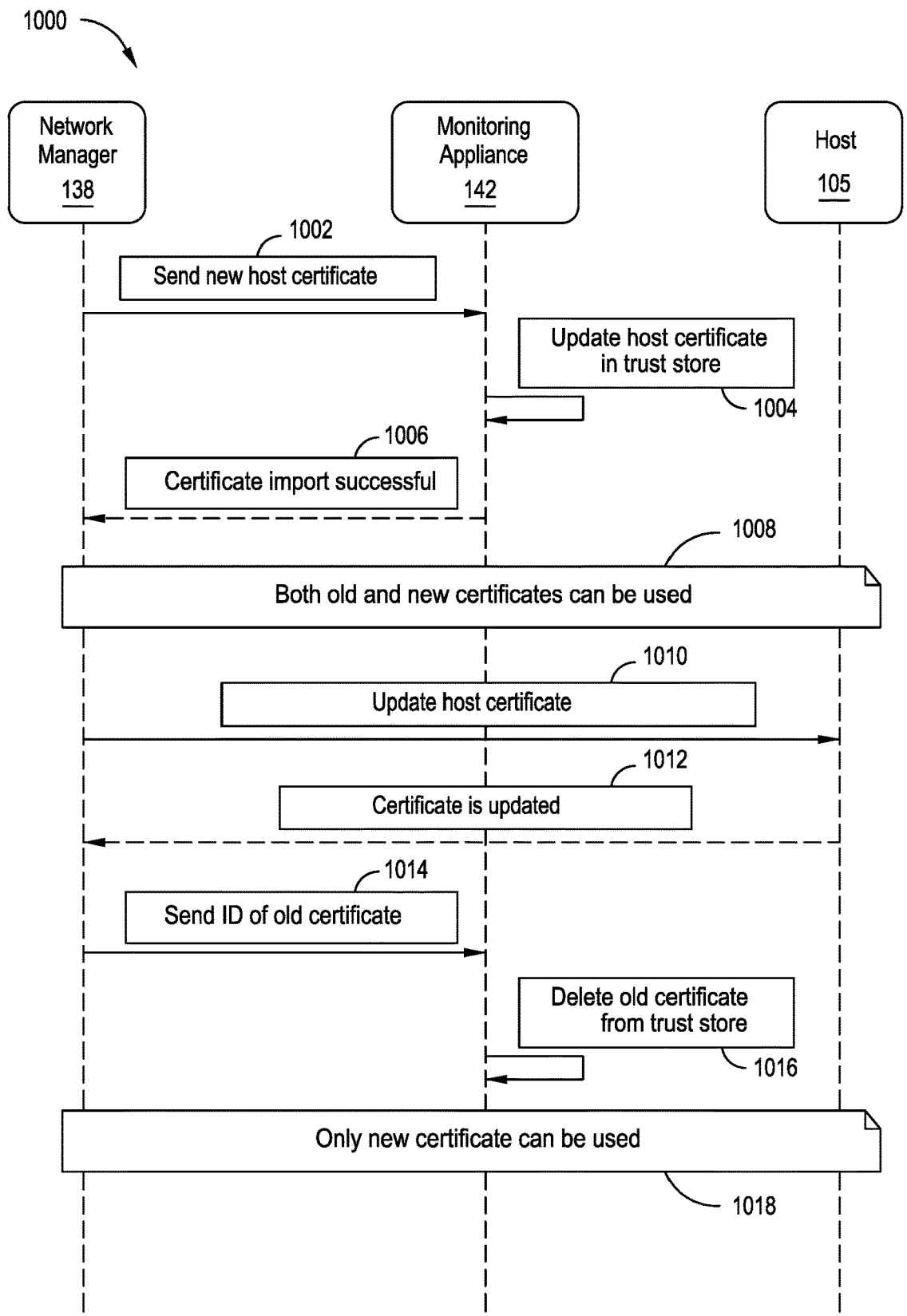
FIG. 10 depicts another example of an exchange of messages related to establishing authentication among components in a network according to embodiments of the present disclosure.

FIG. 10 depicts another example of an exchange 1000 of messages related to establishing authentication among components in a network according to embodiments of the present disclosure. Exchange 1000 includes network manager 138, monitoring appliance 142, and a host 105 of FIG. 1. Exchange 1000 may relate to handling a certificate change for host 105.

Changing a certificate of a host managed by network manager 138 goes through network manager 138, so network manager 138 knows both the old and new host certificates.

At 1002, network manager 138 sends a new certificate for host 105 to monitoring appliance 142. For example, an administrator may provide configuration input to network manager 138 requesting a change to the certificate of host 105. At 1004, monitoring appliance 142 updates the certificate of host 105 in its trust store based on the new host certificate received at 1002. At 1006, monitoring appliance 142 sends a notification to network manager 138 that the new certificate of host 105 was successfully imported.

At 1008, both an old certificate and the new certificate of host 105 can be used. At 1010, network manager 138 updates the certificate of host 105 by providing the new host certificate to host 105. At 1012, host 105 sends a notification to network manager 138 that the certificate of host 105 was successfully updated.

At 1014, network manager 138 sends an identifier of the old certificate of host 105 to monitoring appliance 142 and, at 1016, monitoring appliance 142 deletes the old certificate of host 105 from its trust store.

At 1018, only the new certificate of host 105 can be used.

Certain embodiments discussed herein ensure existing messages are not lost when adding or deleting nodes or hosts, or when changing the certificate of any component. For example, messages are not lost even when a messaging infrastructure supports a broker that can dynamically refresh secure sockets layer (SSL) context or a client that can restart without restarting processes.

When there is any change to a broker trust store, the broker will need to refresh its SSL context. New connections will be authenticated with the latest trust store after the refresh, but there is no impact to existing established connections. In the case of a deletion or client certificate exchange, the existing connection needs to be dropped by messaging client. Messaging clients may need to restart when there is a change to a broker certificate. If restarting the whole process is not required, the application running context can be preserved and the same message, if not delivered, can be sent again using the new broker certificate.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of establishing mutual authentication between components in a network, comprising:
  receiving, by a virtualization manager, a request to deploy a node of a monitoring appliance, wherein the request comprises a token for accessing a network manager;
  deploying, by the virtualization manager, the node of the monitoring appliance in response to the request;
  providing, by the virtualization manager, the token for accessing the network manager to the node of the monitoring appliance;
  generating, by the node of the monitoring appliance, a certificate of the node of the monitoring appliance;
  providing, by the node of the monitoring appliance, the certificate of the node of the monitoring appliance to the network manager with the token for accessing the network manager;
  adding, by the network manager, based on the token for accessing the network manager, the certificate of the node of the monitoring appliance to a first trust store;
  providing, by the network manager, a network manager certificate to the node of the monitoring appliance; and
  adding, by the node of the monitoring appliance, the network manager certificate to a second trust store.

2. The method of claim 1, wherein providing, by the node of the monitoring appliance, the certificate of the node of the monitoring appliance to the network manager with the token for accessing the network manager comprises providing, by a messaging broker located in the node of the monitoring appliance, the certificate of the node of the monitoring appliance and the token for accessing the network manager to an agent of the monitoring appliance located in the network manager.

3. The method of claim 1, further comprising:
  providing, by the network manager, a host certificate of a given host machine to the node of the monitoring appliance;
  adding, by the node of the monitoring appliance, the host certificate to the second trust store.

4. The method of claim 1, further comprising:
  providing, by an additional node of the monitoring appliance, a respective certificate of the additional node of the monitoring appliance to the network manager with the token for accessing the network manager;
  adding, by the network manager, based on the token for accessing the network manager, the respective certificate of the additional node of the monitoring appliance to the first trust store;
  providing, by the network manager, the respective certificate of the additional node of the monitoring appliance to the node of the monitoring appliance; and
  adding, by the node of the monitoring appliance, the respective certificate of the additional node of the monitoring appliance to the second trust store.

5. The method of claim 4, further comprising:
  sending, by the network manager, an undeployment request for the node of the monitoring appliance to the virtualization manager;
  removing, by the virtualization manager, the node of the monitoring appliance from the network;
  removing, by the network manager, the certificate of the node of the monitoring appliance from the first trust store.

6. The method of claim 5, further comprising:
  sending, by the network manager, an identifier of the node of the monitoring appliance to the additional node of the monitoring appliance; and
  removing, by the additional node of the monitoring appliance, the certificate of the node of the monitoring appliance from a third trust store.

7. The method of claim 1, further comprising:
  sending, by the network manager, an updated network manager certificate to the node of the monitoring appliance;
  adding, by the node of the monitoring appliance, the updated network manager certificate to the second trust store; and
  sending, by the node of the monitoring appliance, a notification to the network manager that the updated network manager certificate was successfully imported.

8. The method of claim 7, further comprising:
  removing, by the network manager, the network manager certificate;
  providing, by the network manager, an identifier of the network manager certificate to the node of the monitoring appliance; and
  removing, by the node of the monitoring appliance, the network manager certificate from the second trust store.

9. A non-transitory computer readable medium comprising instructions that, when executed by one or more processors of a computing system, cause the computing system to perform a method of establishing mutual authentication between components in a network, the method comprising:

receiving, by a virtualization manager, a request to deploy a node of a monitoring appliance, wherein the request comprises a token for accessing a network manager;

deploying, by the virtualization manager, the node of the monitoring appliance in response to the request;

providing, by the virtualization manager, the token for accessing the network manager to the node of the monitoring appliance;

generating, by the node of the monitoring appliance, a certificate of the node of the monitoring appliance;

providing, by the node of the monitoring appliance, the certificate of the node of the monitoring appliance to the network manager with the token for accessing the network manager;

adding, by the network manager, based on the token for accessing the network manager, the certificate of the node of the monitoring appliance to a first trust store;

providing, by the network manager, a network manager certificate to the node of the monitoring appliance; and adding, by the node of the monitoring appliance, the network manager certificate to a second trust store.

10. The non-transitory computer readable medium of claim 9, wherein providing, by the node of the monitoring appliance, the certificate of the node of the monitoring appliance to the network manager with the token for accessing the network manager comprises providing, by a messaging broker located in the node of the monitoring appliance, the certificate of the node of the monitoring appliance and the token for accessing the network manager to an agent of the monitoring appliance located in the network manager.

11. The non-transitory computer readable medium of claim 9, wherein the method further comprises:

providing, by the network manager, a host certificate of a given host machine to the node of the monitoring appliance;

adding, by the node of the monitoring appliance, the host certificate to the second trust store.

12. The non-transitory computer readable medium of claim 9, wherein the method further comprises:

providing, by an additional node of the monitoring appliance, a respective certificate of the additional node of the monitoring appliance to the network manager with the token for accessing the network manager;

adding, by the network manager, based on the token for accessing the network manager, the respective certificate of the additional node of the monitoring appliance to the first trust store;

providing, by the network manager, the respective certificate of the additional node of the monitoring appliance to the node of the monitoring appliance; and adding, by the node of the monitoring appliance, the respective certificate of the additional node of the monitoring appliance to the second trust store.

13. The non-transitory computer readable medium of claim 12, wherein the method further comprises:

sending, by the network manager, an undeployment request for the node of the monitoring appliance to the virtualization manager;

removing, by the virtualization manager, the node of the monitoring appliance from the network;

removing, by the network manager, the certificate of the node of the monitoring appliance from the first trust store.

14. The non-transitory computer readable medium of claim 13, wherein the method further comprises:

sending, by the network manager, an identifier of the node of the monitoring appliance to the additional node of the monitoring appliance; and removing, by the additional node of the monitoring appliance, the certificate of the node of the monitoring appliance from a third trust store.

15. The non-transitory computer readable medium of claim 9, wherein the method further comprises:

sending, by the network manager, an updated network manager certificate to the node of the monitoring appliance;

adding, by the node of the monitoring appliance, the updated network manager certificate to the second trust store; and sending, by the node of the monitoring appliance, a notification to the network manager that the updated network manager certificate was successfully imported.

16. The non-transitory computer readable medium of claim 15, wherein the method further comprises:

removing, by the network manager, the network manager certificate;

providing, by the network manager, an identifier of the network manager certificate to the node of the monitoring appliance; and removing, by the node of the monitoring appliance, the network manager certificate from the second trust store.

17. A system comprising:

one or more processors; and a non-transitory computer readable medium comprising instructions that, when executed by the one or more processors, cause the system to perform a method of establishing mutual authentication between components in a network, the method comprising:

receiving, by a virtualization manager, a request to deploy a node of a monitoring appliance, wherein the request comprises a token for accessing a network manager;

deploying, by the virtualization manager, the node of the monitoring appliance in response to the request;

providing, by the virtualization manager, the token for accessing the network manager to the node of the monitoring appliance;

generating, by the node of the monitoring appliance, a certificate of the node of the monitoring appliance;

providing, by the node of the monitoring appliance, the certificate of the node of the monitoring appliance to the network manager with the token for accessing the network manager;

adding, by the network manager, based on the token for accessing the network manager, the certificate of the node of the monitoring appliance to a first trust store;

providing, by the network manager, a network manager certificate to the node of the monitoring appliance; and adding, by the node of the monitoring appliance, the network manager certificate to a second trust store.

18. The system of claim 17, wherein providing, by the node of the monitoring appliance, the certificate of the node of the monitoring appliance to the network manager with the token for accessing the network manager comprises providing, by a messaging broker located in the node of the monitoring appliance, the certificate of the node of the monitoring appliance and the token for accessing the network manager to an agent of the monitoring appliance located in the network manager.

19. The system of claim 18, wherein the method further comprises:
- providing, by the network manager, a host certificate of a given host machine to the node of the monitoring appliance;
- adding, by the node of the monitoring appliance, the host certificate to the second trust store.

20. The system of claim 17, wherein the method further comprises:
- providing, by an additional node of the monitoring appliance, a respective certificate of the additional node of the monitoring appliance to the network manager with the token for accessing the network manager;
- adding, by the network manager, based on the token for accessing the network manager, the respective certificate of the additional node of the monitoring appliance to the first trust store;
- providing, by the network manager, the respective certificate of the additional node of the monitoring appliance to the node of the monitoring appliance; and
- adding, by the node of the monitoring appliance, the respective certificate of the additional node of the monitoring appliance to the second trust store.

* * * * *